US008143997B2

(12) United States Patent
Marr, III

(10) Patent No.: US 8,143,997 B2
(45) Date of Patent: Mar. 27, 2012

(54) SYSTEM FOR SELF-SERVICE CHECKOUT INVENTORY CONTROL

(75) Inventor: Raymond Leonard Marr, III, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 12/165,450

(22) Filed: Jun. 30, 2008

(65) Prior Publication Data

US 2009/0322481 A1 Dec. 31, 2009

(51) Int. Cl.
*H04Q 5/22* (2006.01)
(52) U.S. Cl. ............... 340/10.3; 235/383; 340/572.1
(58) Field of Classification Search .............. 340/1.1, 340/10.1–10.6, 572.1–572.9; 235/375–385
See application file for complete search history.

(56) References Cited

U.S. PATENT DOCUMENTS

| | | | |
|---|---|---|---|
| 4,384,281 A * | 5/1983 | Cooper | 340/572.2 |
| 4,623,877 A * | 11/1986 | Buckens | 340/572.2 |
| 5,239,167 A | 8/1993 | Kipp | |
| 5,530,702 A | 6/1996 | Palmer | |
| 5,539,394 A | 7/1996 | Cato | |
| 5,729,697 A * | 3/1998 | Schkolnick et al. | 705/23 |
| 6,032,127 A | 2/2000 | Schkolnick et al. | |
| 6,262,684 B1 * | 7/2001 | Stewart et al. | 343/702 |
| 6,628,962 B1 * | 9/2003 | Katsura | 455/556.2 |
| 7,225,980 B2 * | 6/2007 | Ku et al. | 235/383 |
| 2002/0170961 A1 * | 11/2002 | Dickson et al. | 235/383 |
| 2006/0208072 A1 | 9/2006 | Ku et al. | |
| 2006/0293968 A1 * | 12/2006 | Brice et al. | 705/26 |
| 2007/0034692 A1 | 2/2007 | Johnson | |
| 2007/0057774 A1 | 3/2007 | Kawamata | |
| 2007/0085682 A1 * | 4/2007 | Murofushi et al. | 340/572.1 |
| 2008/0088101 A1 | 4/2008 | Ferguson | |
| 2008/0243626 A1 * | 10/2008 | Stawar et al. | 705/23 |

FOREIGN PATENT DOCUMENTS

| | | |
|---|---|---|
| JP | 2007081746 | 3/2007 |
| KR | 2006118172 | 11/2006 |
| KR | 2007045463 | 5/2007 |
| KR | 2007081618 | 8/2007 |

OTHER PUBLICATIONS

Efficient Object Identification with Passive RFID Tags, Harald Vogt, Dept. of Computer Science, Swiss Federal Institute of Technology, 8092 Zurich, Switzerland.

* cited by examiner

*Primary Examiner* — Brian Zimmerman
*Assistant Examiner* — James Yang
(74) *Attorney, Agent, or Firm* — Shimokaji & Assoc., P.C.

(57) ABSTRACT

A system for providing self-service inventory control comprises at least one RFID antenna mat placed adjacent to a cart with the RFID antenna transmitting and receiving information from a plurality of passive RFID tags within the cart, a connector unit attached to the cart and including a connector a processing unit for determining a position of said connector unit with respect to the processing unit, receiving information from each of the RFID tags, to obtain at least one characteristic information regarding each item and a display unit for displaying the obtained characteristic information.

1 Claim, 4 Drawing Sheets

SYSTEM FOR SELF-SERVICE CHECKOUT INVENTORY CONTROL

BACKGROUND OF THE INVENTION

The present invention is related to the field of retail merchandizing and more particularly with regard to a method and system for providing increasing the throughput in retail store checkout lanes.

Self service checkout lines are a recent feature that many retail stores have incorporated into their business model. Similar to self-service gas pumping, retail self-service checkout is intended to expedite the purchase of store items by a customer while reducing the number of store employees needed as cashiers.

In one aspect of self-service checkout, a customer scans each item to be purchased before a scanner that reads a bar code attached to the item packaging. The scanners determine the item scanned and accesses a data base to obtain the prices of the item. A similar method, using RF Identification tags (RFID) is also known. Using RFID tags, a user may scan the item before a sensor that reads the RFID tag value and determines a price or other characteristic of the item scanned. With regard to RFID technology it is known in the art that there are three types of RFID tags; active, semi-active and passive.

Active RFID tags have the longest range but require an active source (a battery) to operate as they actively broadcast a signal. Semi-passive RFID tags similarly require a battery to broadcast a signal. But this signal is broadcast in response to an RFID signal. Passive RFID tags do not require a battery, are the least expensive and are small enough to be placed on any package. Thus, passive RFID tags are most commonly used in an inventory control system. However, passive RFID tags have a very limited range and, thus, require the RFID tag to be placed close to the sensor element. Hence, their use in self-service checkout requires that each item must be individually placed before the sensor, which is time-consuming.

Hence, there is a need for a faster method of determining those items to be checked out in a self-service checkout.

SUMMARY OF THE INVENTION

A system for providing self-service inventory control is disclosed. The system comprises at least one RFID antenna mat placed adjacent to at least one of a horizontal and vertical surface of said cart; said RFID antenna providing a gain and sensitivity to transmit and receive information from a plurality of passive RFID tags within said cart, each of said RFID tags containing information regarding an associated item and a connector unit attached to the cart at a known position, the connector unit in connection with each of the at least one RFID antenna mats and including a connector for transferring said RFID tag information, a processing unit comprising, a extendable arm and a connector attached to one end of the extendable arm, and a processor for determining a position of said connector unit with respect to the processing unit, controlling the movement of the arm to extend the arm connector proximate to the connector unit, the connector unit connector being in communication with said arm connector when said connectors are one of proximate or physical connection to each other, initiating at least one request signal to the connector unit connector, said read signal being transmitted through the connector unit to said at least one antenna mat, receiving information from each of the RFID tags receiving the request signal, accessing a data base to obtain at least one characteristic information regarding each item based on the associated RFID tag read, tabulating the obtained characteristic information of each associated item and a display unit for displaying the tabulated obtained characteristic information.

These and other features, aspects and advantages of this invention of the present invention will become better understood with reference to the following drawings, description, and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
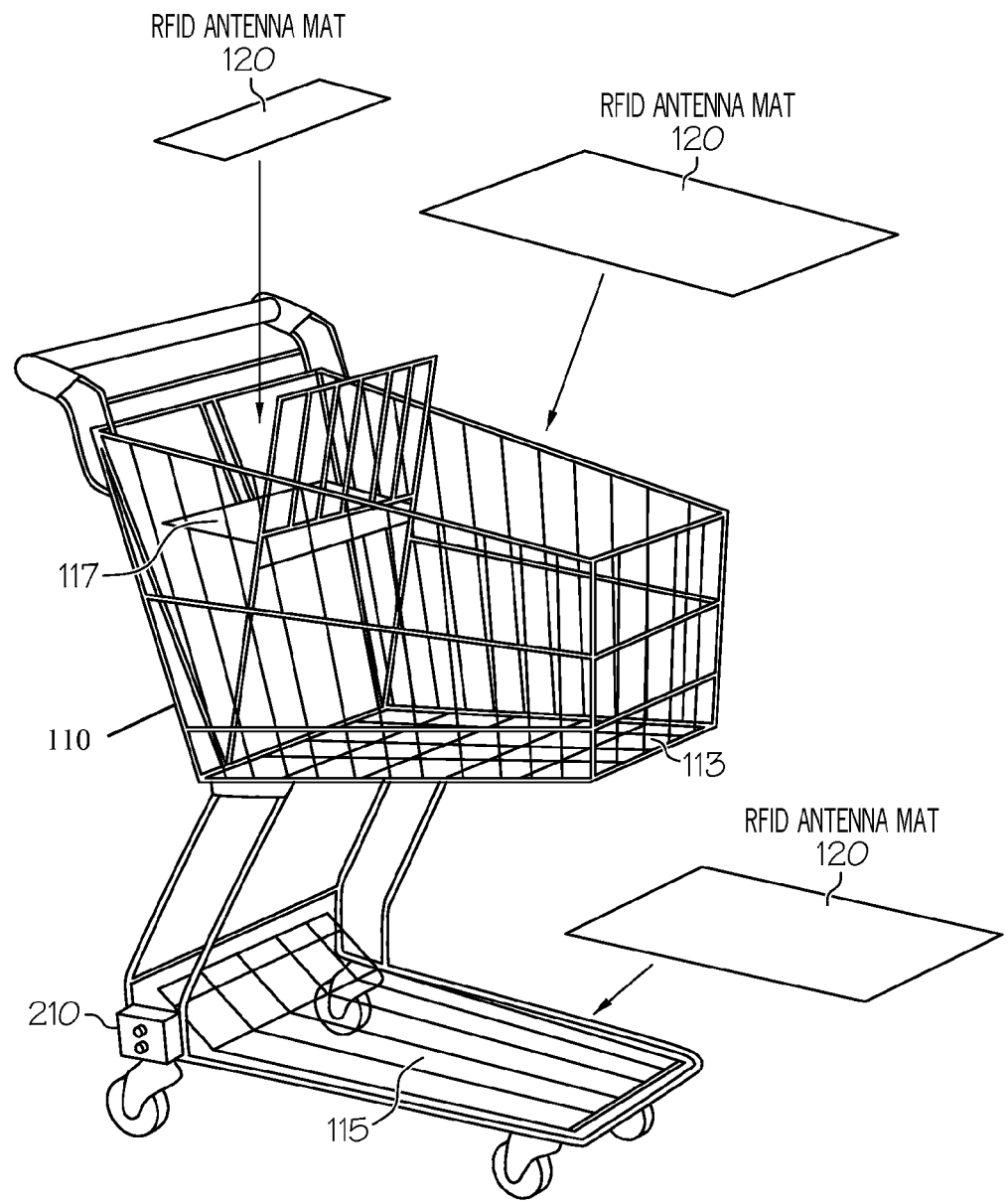
FIG. 1 illustrates a perspective view of a cart featuring a RFID antenna mat in accordance with the principles of the invention.
Figure 2:
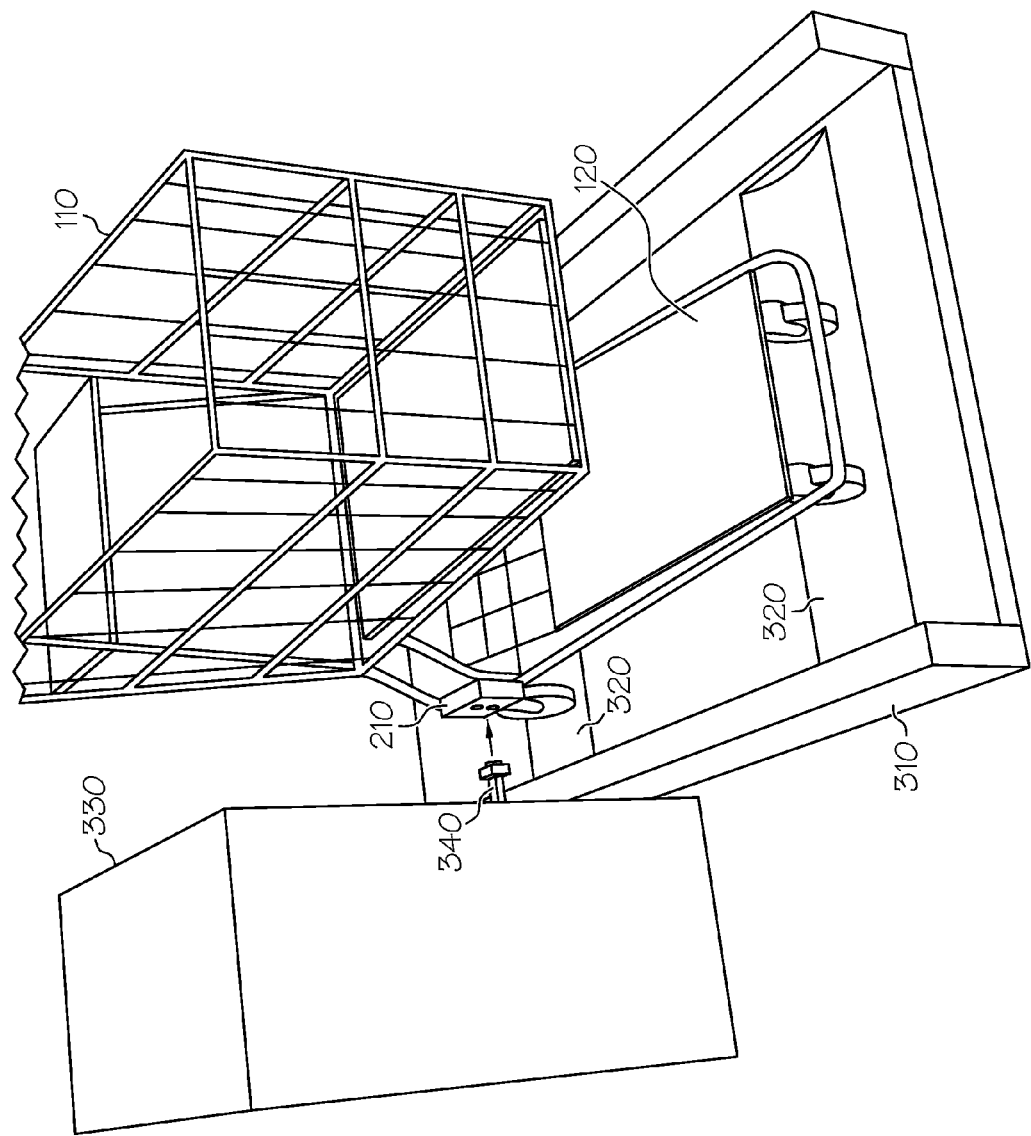
FIG. 2 illustrates a perspective view of the cart shown in FIG. 1 in an exemplary operative mode in accordance with the principles of the invention.

FIG. 1 illustrates a perspective view 100 of a shopping cart 110 incorporating RFID antenna mats 120 on each of the horizontal surfaces within the cart. In this illustrated case, the RFID antenna mats 120 are placed on each of the horizontal surfaces of the main compartment 113, the lower auxiliary tray surface 115 and the upper tray 117. In this configuration, the RFID antenna mats are placed under all the items that may be collected in cart 110. RFID antenna mats 120 are useful in providing an increased level of gain to transmit a request signal and increased sensitivity to detect the presence of signals of passive RFID sensors on items located in the shopping cart (not shown). Although the RFID antenna mats are shown lying on at least one of the horizontal surfaces 113, 115 and 117, it would be recognized that the mats may also be place on at least one vertical surface (not labeled) of cart 110 without altering the scope of the invention. As would be known, the antenna mats may be composed of a coiled antenna within a protective mat material.

Also shown is connector unit 210, attached to cart 110. Connector unit 210 is electrically connected to each of the RFID mats 120 and is used to transfer information regarding each item detected by corresponding RFID antenna mat 120. Connector unit 210 is shown adjacent to a rear wheel. However, it would be recognized that the connector unit 210 may be placed at any convenient location on or within cart 110. Connector unit 210 includes a means for transferring a read request through to antenna mats 120 and to transfer information received from each RFID tag.

Figure 3:
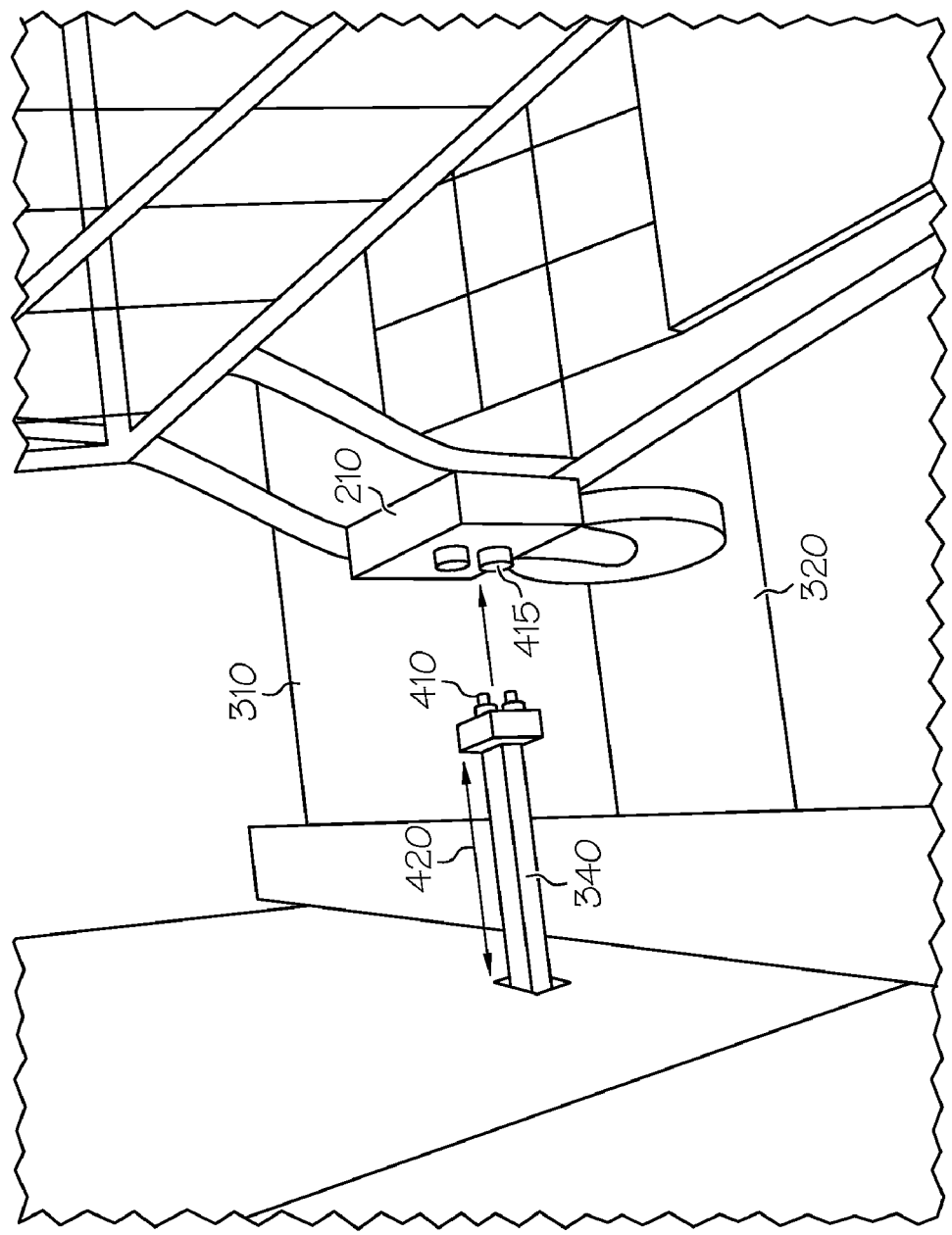
FIG. 3 illustrates an expanded view of the system in accordance with the principles of the invention.

FIG. 3 illustrates an exemplary self-service checkout system utilizing the principles of the invention. In this exemplary embodiment of the invention, cart 110 is rolled along a checkout lane 310, which includes positioning troughs 320. Troughs 320, which are shown in a highly exploded view, are positioned within checkout lane 310 to position cart 110 is a desired or known position. Although two troughs 320 are shown, it would be recognized that only one trough need be used to provide a proper positioning of cart 110.

Next to lane 310 is checkout processing unit 330 that is able to process the data regarding the items stored in cart 110.

Processing unit 330 may further be connected to a network (not shown). The network (not shown) may allow processing unit 330 to access a database of information regarding the items detected in cart 110. The database may include the price or other characteristic information of the item, any sale or discount associated with one or more items and the number of remaining items. This information may be used to reduce the cost of changing item prices and maintain an inventory of such items.

Extending from processing unit 330 is arm 340. Arm 340 includes a connector 410 that provides a means to read the RFID tag information provided through connector unit 210.

FIG. 3 illustrates a close-up view of arm 340 and its relationship with connector unit 210. As shown, arm 340 is movable or extendable 420 such that connector 410 is within a known distance or position to connector unit 210 and connector 415 shown on connector unit 210. In this illustrated embodiment, connector 410 is extended so as to be in a proximate position to connector 415 such that communication between connector 410 and connector 415 is achieved. Information regarding RFID tag information associated with individual items in cart 110 may be transmitted through antenna mat 120 and to processing unit 330 through connector 415 and connector 410. The RFID tag information may be transmitted to processor unit 330 in response to a request signal or signals provided by processor unit 330. In one aspect of the invention, the connector 410 may include a physical connector and connector 415 may include a matching physical connector. For example, connector 410 and connector 415 may represent conventional USB (Universal Serial Bus), serial, parallel, IEEE 1394 or other similar physical connector that allow the transfer of data between devices using an appropriate data transfer protocol. In this case, the term "proximate" represents a physical connection between the connector 410 and connector box 415. In another aspect of the invention, connector 410 and connector 415 may include a wireless data transfer mechanism. In this case, the wireless data transfer may represent a capacitive coupling, a short range communication, e.g., Bluetooth, Firewire, or a longer ranger communication, e.g., Wi-Fi. As would be recognized, in this case connector 410 and connector 415 may each include directional antenna to focus the transmission so as to require a minimum amount of power. In addition, the arm may move connector 410 and connector 415 in a position to retain a non-physical, connection that allows for wireless data transfer. Protocols for USB, serial, parallel, Bluetooth, Firewire, WiFi are well known in the art and need not be explained in detail herein.

Figure 4:
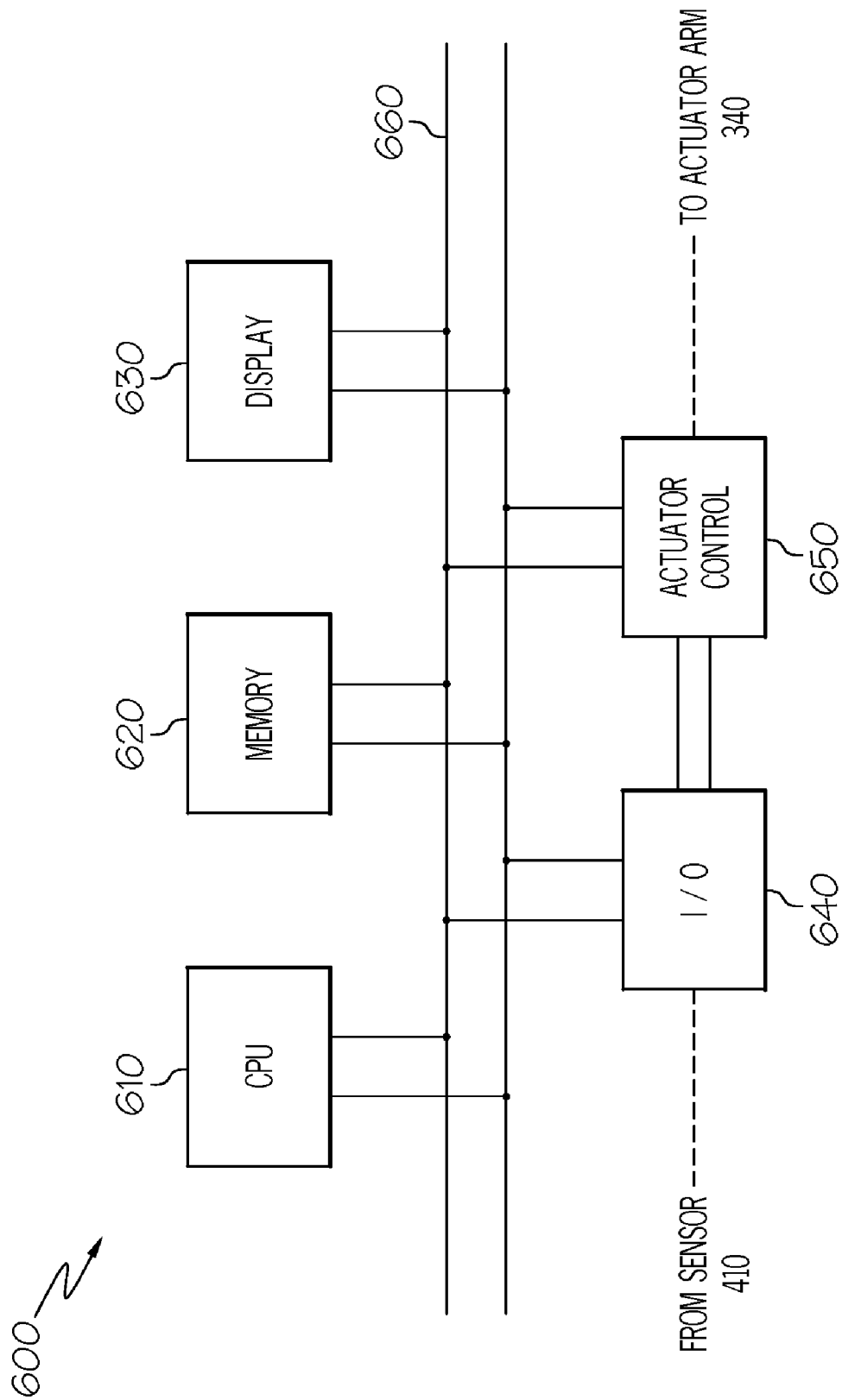
FIG. 4 illustrates a system for implementing the processing described herein.

FIG. 4 illustrates an exemplary system for implementing the processing described herein. In this exemplary system embodiment, a processor (CPU) 610, memory 620, display 630, I/O device 640 and actuator control 650 may each be in communication via a communication bus 660. Processor 610 may be any type of processor that receives known inputs and performs one or more processing steps under the direction of programming instructions. Processor 610 may be CISC (complete instruction set computer) or RISC (reduced instruction set computer) type processor. Memory 620 may be, for example, a solid-state semiconductor memory represented as RAM, ROM, EPROM, Flash, etc., that may store instructions that provide instruction to processor 610. The instructions, i.e., code, may be stored in permanent memory, e.g., PROM, which variable or changeable data may be store in RAM.

Display 630 may be used to present a list of each item and price scanned by sensor 410 (not shown).

I/O device 640 may provide a means for inputting and outputting information to and from processor 610. For example, I/O device 640 may receive information from sensor 410 regarding each item located in cart 110 (not shown). This information may be provided to processor 610 to record each item to determine a total price of all the items in the cart 110. The total price, for example, may then be displayed, along with the individual prices of each item, on display 630. I/O device 640 may further be in communication with actuator control 650 to provide control commands to actuator control 650 to extend or retract arm 340. Although not shown it would be recognized that the information may be received from or provided to a network, such as WAN, LAN, POTS and the Internet.

In one aspect of the invention, multiple read requests may be generated to obtain the RFID tag information from each item within cart 110. For example, processing unit 330 may broadcast a signal at 10 Hz (10 cycles per second) for a predetermined period of time. Although, a 10 Hz rate is described herein, it would be recognized that a rate of broadcasting a signal may be determined using a formula that takes into account the signal strength of the RFID reader, the size and placement of the antenna, etc. Implementing something like this would allow for the most efficient scanning of multiple RFID tags, resulting in the highest number of successful scans. For more information on the topic and a detailed explanation of how this works, may be found in "*Efficient Object Identification with Passive RFID Tags*," Harold Vogt, Department of Computer Science at the Swiss Federal Institute of Technology, date unknown.

In addition to the method described above, software/firmware/microcode may also be used to determine the strength of the signal received from each RFID tag that is scanned. Because each RFID tag will be in a different orientation and location within the shopping cart, the signal received from each one will be either slightly stronger or slightly weaker than the ones surrounding it. This signal strength will be unique for each tag, since no two are in the exact same location. As a result, this information can be used to determine the number of items in the cart, as well as ensure that no item is scanned more than once. For example, the processor may determine the location of the connector unit with respect to the processing unit, extend arm 340 to be within a known position of connector unit 210, such that connector 410 and connector 415 are in communication with each other. The processor may then initiate a read request that is passed through the connector 415 to the at least one antenna mat 120. The processor may then receive information from each of the RFID tags receiving the request signal. The RFID tag information may be used to collect information, such as price, and tabulate this information and provide it to a display unit, for example.

Weight of the items in the cart may be used to ensure that all of the items in the shopping cart have been scanned and nothing has been left out. This technology is already present in commercial Self Checkout lanes, wherein scales underneath a conveyer belt and/or bagging shelf are used to determine the weight of each item that is scanned. This weight is then compared with a database. If the weight of the scanned item does not match what is in the database, then it is determined that the wrong item was placed on the conveyor belt and/or bagging shelf and an employee of the store is alerted to investigate. This could be easily implemented into this invention by installing a scale underneath the troughs 320 that the cart 110 rests in at the checkout lane. After scanning all of the RFID tags in the cart, their combined weight (minus the known weight of the cart) will be compared against the known item weights in a database. If the weights do not match, several courses of action may be taken, including rescanning all of the RFID tags in the shopping cart to ensure that nothing was missed, or alerting a store employee to investigate.

It would be recognized by those skilled in the art, that the invention described herein can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

As can be appreciated by those skilled in the art, the present invention provides an improved system and method for providing a less burdensome self-service checkout as all the items are detected by a RFID sensor rather than having each item individually scanned. While the foregoing is shown with regard to a checkout lane and associated shopping cart, it would be appreciated that the principles described herein may be applicable to other types of systems, e.g., inventory control.

It should be understood, of course, that the foregoing relates to exemplary embodiments of the invention and that modifications may be made without departing from the spirit and scope of the invention as set forth in the following claims.

What is claimed is:

1. A self-service inventory control system comprising:
   a cart comprising:
      at least one RFID antenna mat placed adjacent to at least one of a horizontal and vertical surface of said cart;
      the at least one RFID antenna mat providing a gain and sensitivity to transmit and receive information from a plurality of passive RFID tags within said cart, each of said RFID tags containing information regarding an associated item; and
      a connector unit attached to the cart at a predetermined known position, the connector unit in communication with each of the at least one RFID antenna mats and including a connector for transferring said RFID tag information;
   a processing unit comprising:
      an extendable arm; and
      a connector attached to one end of the extendable arm, and
      a processor for:
         determining a position of said connector unit with respect to the processing unit;
         controlling the movement of the arm to extend an arm connector proximate to the connector unit, the connector unit connector being in communication with said arm connector when the connector unit connector and the arm connector are in one of a proximate or a physical connection to each other;
         initiating at least one request signal to the connector unit connector, said request signal being transmitted through the connector unit to said at least one antenna mat;
         receiving information from each of the RFID tags receiving the request signal;
         accessing a data base to obtain at least one characteristic information regarding each item based on the associated RFID tag;
         tabulating the obtained characteristic information of each associated item; and
   a display unit for displaying the tabulated obtained characteristic information.

* * * * *